US011429422B2

(12) United States Patent
Rafey (10) Patent No.: US 11,429,422 B2
(45) Date of Patent: Aug. 30, 2022

(54) SOFTWARE CONTAINER REPLICATION USING GEOGRAPHIC LOCATION AFFINITY IN A DISTRIBUTED COMPUTING ENVIRONMENT

(71) Applicant: Dell Products L.P., Round Rock, TX (US)

(72) Inventor: Mohammad Rafey, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 446 days.

(21) Appl. No.: 16/662,893

(22) Filed: Oct. 24, 2019

(65) Prior Publication Data

US 2021/0124603 A1    Apr. 29, 2021

(51) Int. Cl.
  *G06F 9/455*    (2018.01)
  *G06K 9/62*     (2022.01)
  *G06N 20/00*    (2019.01)

(52) U.S. Cl.
  CPC ....... *G06F 9/45558* (2013.01); *G06K 9/6215* (2013.01); *G06K 9/6223* (2013.01); *G06N 20/00* (2019.01); *G06F 2009/4557* (2013.01); *G06F 2009/45595* (2013.01)

(58) Field of Classification Search
  CPC ...... G06F 9/45558; G06F 2009/45595; G06K 9/6215; G06K 9/6223; G06N 20/00
  See application file for complete search history.

(56) References Cited

U.S. PATENT DOCUMENTS

| | | |
|---|---|---|
| 2002/0173984 A1 | 11/2002 | Robertson et al. |
| 2010/0312809 A1 | 12/2010 | Calder et al. |
| 2011/0060821 A1 | 3/2011 | Loizeaux et al. |
| 2014/0101300 A1 | 4/2014 | Rosensweig et al. |
| 2018/0349514 A1* | 12/2018 | Alzate Perez .... G06F 16/90332 |
| 2020/0336400 A1* | 10/2020 | Juen ..................... H04L 67/18 |
| 2020/0401931 A1* | 12/2020 | Duan ..................... G06F 16/29 |
| 2020/0409761 A1* | 12/2020 | Stuntebeck .......... G06F 9/5027 |

(Continued)

OTHER PUBLICATIONS

Wikipedia, "Geohash," https://en.wikipedia.org/wiki/Geohash, 2019, 7 pages.

(Continued)

*Primary Examiner* — Jacob D Dascomb
(74) *Attorney, Agent, or Firm* — Ryan, Mason & Lewis, LLP (57) ABSTRACT

A method includes monitoring client requests to access software container instances hosted by container host devices of a geographically-distributed software container platform and identifying, for a given software container instance hosted by a first one of the container host devices, geographic clusters of the client requests. The method also includes calculating a network distance from a given one of the geographic clusters to each of at least a subset of the container host devices. The method further includes replicating the given software container instance in a second one of the container host devices responsive to determining that the calculated network distance from the given geographic cluster to the second container host device is at least a threshold amount less than the calculated network distance from the given geographic cluster to the first container host device.

20 Claims, 10 Drawing Sheets

(56) References Cited

U.S. PATENT DOCUMENTS

2021/0314418 A1* 10/2021 Abdul Wahab ....... G06F 9/5088

OTHER PUBLICATIONS

Wikipedia, "Haversine Formula," https://en.wikipedia.org/wiki/Haversine_formula, 2019, 4 pages.

Geeksforgeeks, "Haversine Formula to Find Distance between Two Points on a Sphere," https://www.geeksforgeeks.org/haversine-formula-to-find-distance-between-two-points-on-a-sphere/, 2019, 16 pages.

* cited by examiner

| DATE TIMESTAMP | CONTAINER INSTANCE IDENTIFIER | LATITUDE | LONGITUDE | GEOGRAPHIC HASH |
|---|---|---|---|---|
| 20080501T08:30:52Z | 462C-B1E7-615199A92463 | 29 | 34 | U4PRUYDQQVJ |
| 20080501T08:31:52Z | 4355-AF90-BFA961E2F60D | 34 | 76 | FGWRERWEWE |
| 20080501T08:31:62Z | 4ED6-98FC-241B3BCF2171 | 45 | 98 | WEWRERERERR |
| 20080501T08:30:52Z | 4D89-A2C5-C568ABD09BB3 | 12 | 67 | GTJYHJUYJUYJU |
| 20080501T08:30:52Z | 41D7-88E1-DD27D8F457C2 | 45 | 45 | ASASDSDSDD |
| 20080501T08:30:52Z | 4341-91E9-B0031F432FC2 | 78 | 32 | GTJYHJUYJUYJU |
| 20080501T08:30:52Z | 4D61-B1DD-F0EB6E9C2E14 | 98 | 56 | U4PRUYDQQVJ |
| 20080501T08:40:52Z | 462C-B1E7-615199A92463 | 65 | 44 | RFGFGFGHFHGH |
| 20080501T08:30:52Z | 4ED6-98FC-241B3BCF2171 | 43 | 87 | WEWRERERERR |
| 20080501T08:30:52Z | 4D89-A2C5-C568ABD09BB3 | 32 | 56 | WRETRTRTTRYRRT |
| 20080501T08:60:52Z | 41D7-88E1-DD27D8F457C2 | 65 | 65 | UIYUYIUYIUYI |
| 20080501T08:30:52Z | 4355-AF90-BFA961E2F60D | 76 | 34 | GTJYHJUYJUYJU |
| 20080501T08:30:52Z | 4D89-A2C5-C568ABD09BB3 | 34 | 23 | U4PRUYDQQVJ |
| 20080501T08:30:52Z | 41D7-88E1-DD27D8F457C2 | 23 | 65 | UIUIUIJGHGH |
| 20080501T08:30:52Z | 4D61-B1DD-F0EB6E9C2E14 | 98 | 56 | WEWRERERERR |
| 20080501T08:40:52Z | 462C-B1E7-615199A92463 | 65 | 44 | EDXCDFDFDVD |
| 20080501T08:30:52Z | 4ED6-98FC-241B3BCF2171 | 43 | 87 | XZCXZCXCXCC |
| 20080501T08:60:52Z | 4D89-A2C5-C568ABD09BB3 | 32 | 56 | FGWRERWEWE |
| 20080501T08:30:52Z | 41D7-88E1-DD27D8F457C2 | 65 | 65 | U4PRUYDQQVJ |
| 20080501T08:30:52Z | 4355-AF90-BFA961E2F60D | 76 | 34 | GTJYHJUYJUYJU |
| 20080501T08:30:52Z | 4D89-A2C5-C568ABD09BB3 | 34 | 23 | WEWRERERERR |
| 20080501T08:30:52Z | 41D7-88E1-DD27D8F457C2 | 23 | 65 | SDSDSDSDEF |
| 20080501T08:30:52Z | 4D61-B1DD-F0EB6E9C2E14 | 98 | 56 | U4PRUYDQQVJ |

SOFTWARE CONTAINER REPLICATION USING GEOGRAPHIC LOCATION AFFINITY IN A DISTRIBUTED COMPUTING ENVIRONMENT

FIELD

The field relates generally to information processing, and more particularly to techniques for managing cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for replicating software containers using geographic location affinity in a distributed computing environment.

In one embodiment, a method comprises monitoring client requests to access one or more software container instances each hosted by one or more of a plurality of container host devices of a geographically-distributed software container platform and identifying, for a given software container instance hosted by a first one of the plurality of container host devices, one or more geographic clusters of the monitored client requests. The method also comprises calculating a network distance from a given one of the geographic clusters to each of at least a subset of the plurality of container host devices, the subset of the plurality of container host devices comprising the first container host device and at least a second container host device. The method further comprises replicating the given software container instance in the second container host device responsive to determining that the calculated network distance from the given geographic cluster to the second container host device is at least a threshold amount less than the calculated network distance from the given geographic cluster to the first container host device. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
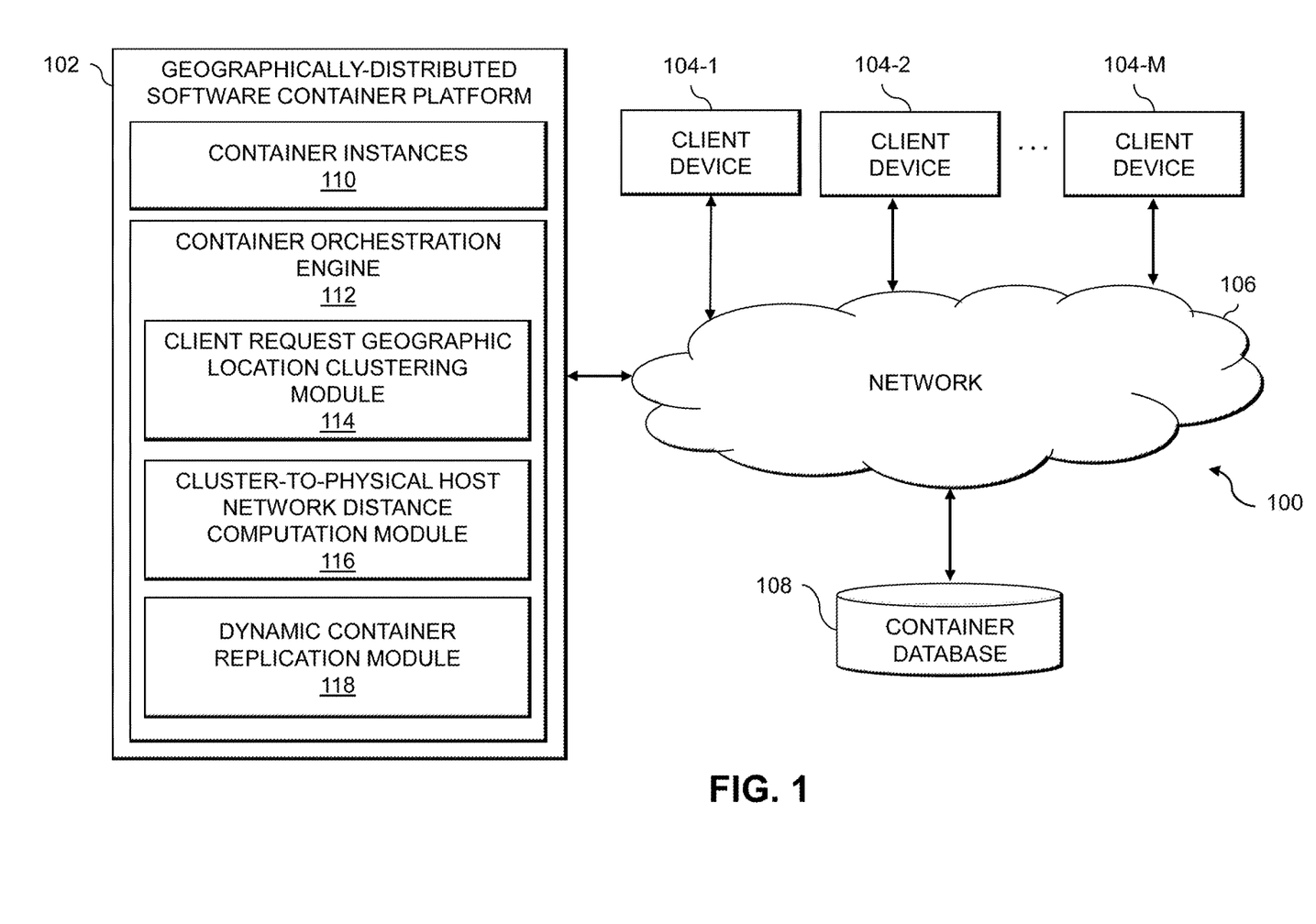
FIG. 1 is a block diagram of an information processing system for replicating software containers using geographic location affinity in a distributed computing environment in an illustrative embodiment.

FIG. 1 shows an information processing system 100 configured in accordance with an illustrative embodiment. The information processing system 100 is assumed to be built on at least one processing platform and provides functionality for replicating software containers using geographic location affinity in a geographically-distributed computing environment (e.g., a cloud computing environment). The software containers, also referred to herein as containers, are assumed to be implemented by a geographically-distributed software container platform 102, also referred to herein as a cloud container platform 102 or a container platform 102. Users or clients provide requests to the container platform 102 via client devices 104-1, 104-2, . . . 104-M (collectively, client devices 104). A container orchestration engine 112 of the container platform 102 receives requests from the client devices 104 to execute or access containers, and the container platform 102 runs one or more container instances 110 as requested by the client devices 104. The container platform 102 and client devices 104 are coupled to a network 106. Also coupled to the network 106 is a container database 108, which may store various information relating to the containers and container instances 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternatively comprise virtualized computing resources, such as VMs, containers, etc.

The client devices 104 in some embodiments comprise respective computers associated with a particular company, organization or other enterprise. The container instances 110 running on the container platform 102 may be associated with a particular enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The container database 108, as discussed above, is configured to store and record information relating to containers, such as the geographic location of physical hosts on which the container instances 110 run, the geographic locations of the client devices 104 that request access to or otherwise utilize container instances 110, etc. Such information may be used to "cluster" client requests to containers, with the clustering being used to dynamically replicate the container instances 110 in different physical hosts to reduce latency and improve performance.

The container database 108 in some embodiments is implemented using one or more storage systems or devices associated with the container platform 102. In some embodiments, one or more of the storage systems utilized to implement the container database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the container platform 102 and the container orchestration engine 112, as well as to support communication between the container platform 102, the container orchestration engine 112 and other related systems and devices not explicitly shown.

In some embodiments, the client devices 104 may implement host agents that are configured for communication with the container orchestration engine 112. The container orchestration engine 112, as will be described in further detail below, is configured to monitor container instances 110 running on the container platform 102 and to dynamically replicate container instances 110 on different physical hosts based on clusters of client requests from the client devices 104 to particular ones of the container instances 110. The host agents implemented by the client devices 104 may be configured to receive notifications or alerts when particular ones of the container instances 110 are dynamically replicated by the container orchestration engine 112. In some embodiments, such notifications and alerts for a given one of the container instances 110 may be provided to a given one of the client devices 104 that requested execution of or access to the given container instance 110. In other embodiments, such notifications and alerts may alternatively or further be provided to a system administrator, information technology (IT) personnel or other users that are responsible for managing the container platform 102 or a set of container instances 110, including the given container instance 110, associated with a particular enterprise or other entity.

It should be noted that a "host agent" as this term is generally used herein may comprise an automated entity, such as a software entity running on a processing device. Accordingly, a host agent need not be a human entity.

Although shown as an element of the container platform 102 in this embodiment, the container orchestration engine 112 in other embodiments can be implemented at least in part externally to the container platform 102, for example, as a stand-alone server, set of servers or other type of system coupled to the network 106. In some embodiments, the container orchestration engine 112 may be implemented at least in part within one or more of the client devices 104.

The container orchestration engine 112 in the FIG. 1 embodiment is assumed to be implemented using at least one processing device. Each such processing device generally comprises at least one processor and an associated memory, and implements one or more functional modules for controlling certain features of the container orchestration engine 112. In the FIG. 1 embodiment, the container orchestration engine 112 comprises a client request geographic location clustering module 114, a cluster-to-physical host network distance computation module 116 and a dynamic container replication module 118.

The client request geographic location clustering module 114 is configured to monitor requests by the client devices 104 (e.g., from applications running on the client devices 104) to access one or more of the software container instances 110 each hosted by one or more of a plurality of container host devices of the geographically-distributed software container platform 102. Monitoring the client requests may comprise obtaining, for each client request, an associated timestamp, container instance identifier and latitude and longitude of the originating client device 104. The client request geographic clustering module 114 is also configured to identify, for a given one of the software container instances 110 hosted by a first one of the plurality of container host devices, one or more geographic clusters of the monitored client requests. Identifying a given geographic cluster may utilize respective ones of the client requests which have an associated container instance identifier matching a given container instance identifier of the given software container instance, an associated timestamp within a designated threshold of a current time (e.g., such that only "live" or "real-time" network traffic is considered, as defined by the designated threshold from the current time), and an associated latitude and longitude corresponding to a geographic location within a designated geographic region.

The cluster-to-physical host network distance computation module 116 is configured to calculate a network distance from a given one of the geographic clusters to each of at least a subset of the plurality of container host devices, the subset of the plurality of container host devices comprising the first container host device on which the given software container instance is hosted and at least a second container host device. The calculated network distances may be based at least in part on geographic distances between the given geographic cluster and each of the subset of the plurality of container host devices. The calculated network distances may be further based at least in part on available network bandwidth and network latency between the given geographic cluster and each of the subset of the plurality of container host devices.

The dynamic container replication module 118 is configured to replicate the given software container instance in the second container host device responsive to determining that the calculated network distance from the given geographic cluster to the second container host device is at least a threshold amount less than the calculated network distance from the given geographic cluster to the first container host device. Replicating the given software container instance in the second container host device may further comprise redirecting network traffic originating in the given geographic cluster from the given software container instance hosted in the first container host device to the replicated software container instance hosted in the second container host device.

It should be appreciated that the modules 114, 116 and 118 may continually perform the above-described functionality. For example, as additional client requests come in, the location of the given geographic region may be dynamically updated (e.g., the given geographic region may "move" as the access patterns in live traffic for the given software container instance changes). As the location of the given geographic region changes, the network distances may be re-calculated and the given software container instance may be replicated on a third one of the plurality of container host devices based on the updated network distances from the given geographic region to the plurality of container host devices.

It is to be appreciated that the particular arrangement of the container platform 102, the container orchestration engine 112, the client request geographic location clustering module 114, the cluster-to-physical host network distance computation module 116 and the dynamic container replication module 118 illustrated in the FIG. 1 embodiment is presented by way of example only, and alternative arrangements can be used in other embodiments. As discussed above, for example, the container platform 102, the container orchestration engine 112, the client request geographic location clustering module 114, the cluster-to-physical host network distance computation module 116 and the dynamic container replication module 118 may in some embodiments be implemented internal to one or more of the client devices 104. As another example, the functionality associated with the client request geographic location clustering module 114, the cluster-to-physical host network distance computation module 116 and the dynamic container replication module 118 may be combined into one module, or separated across more than three modules with the multiple modules possibly being implemented with multiple distinct processors or processing devices.

At least portions of the client request geographic location clustering module 114, the cluster-to-physical host network distance computation module 116 and the dynamic container replication module 118 may be implemented at least in part in the form of software that is stored in memory and executed by a processor.

It is to be understood that the particular set of elements shown in FIG. 1 for management of software containers using container profiles is presented by way of illustrative example only, and in other embodiments additional or alternative elements may be used. Thus, another embodiment may include additional or alternative systems, devices and other network entities, as well as different arrangements of modules and other components.

By way of example, in other embodiments, the container orchestration engine 112 may be implemented external to container platform 102, such that the container platform 102 can be eliminated. For example, container instances 110 may run on respective ones of the client devices 104, with the container orchestration engine 112 managing such container instances running on the client devices 104 rather than on a separate container platform 102.

The container platform 102, including the container orchestration engine 112, and other portions of the system 100 may be part of cloud infrastructure as will be described in further detail below.

The container orchestration engine 112 and other components of the container platform 102 and information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The client devices 104 and container platform 102 or components thereof (e.g., the container orchestration engine 112, client request geographic location clustering module 114, cluster-to-physical host network distance computation module 116 and dynamic container replication module 118) may be implemented on respective distinct processing platforms, although numerous other arrangements are possible. For example, in some embodiments at least portions of the container orchestration engine 112 and one or more of the client devices 104 are implemented on the same processing platform. A given client device (e.g., 104-1) can therefore be implemented at least in part within at least one processing platform that implements at least a portion of the container orchestration engine 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the container platform 102, client devices 104 and container database 108, or portions or components thereof, to reside in different data centers. Numerous other distributed implementations are possible. The container platform 102, or portions thereof such as the container orchestration engine 112 can also be implemented in a distributed manner across multiple data centers.

Additional examples of processing platforms utilized to implement the container orchestration engine 112 and other portions of the system 100 in illustrative embodiments will be described in more detail below in conjunction with FIGS. 7 and 8.

It is to be appreciated that these and other features of illustrative embodiments are presented by way of example only, and should not be construed as limiting in any way.

An exemplary process for replicating software containers using geographic location affinity in a distributed computing environment will now be described in more detail with reference to the flow diagram of FIG. 2. It is to be understood that this particular process is only an example, and that additional or alternative processes for replicating software containers using geographic location affinity in a distributed computing environment may be used in other embodiments.

In this embodiment, the process includes steps 200 through 206. These steps are assumed to be performed by the container orchestration engine 112 utilizing the client request geographic location clustering module 114, cluster-to-physical host network distance computation module 116 and dynamic container replication module 118. The process begins with step 200, monitoring client requests to access one or more software container instances each hosted by one or more of a plurality of container host devices of a geographically-distributed software container platform (e.g., a cloud computing platform). Step 200 may include, for a given client request, obtaining a timestamp of the given client request, a container instance identifier, and a latitude and longitude of a geographic location of a source application providing the given client request.

In step 202, one or more geographic clusters of the monitored client request are identified for a given software container instance hosted by a first one of the plurality of container host devices. Step 202 may include identifying a given geographic cluster utilizing respective ones of the client requests each comprising: an associated container instance identifier matching a given container instance identifier of the given software container instance; an associated timestamp within a designated threshold of a current time; and an associated latitude and longitude corresponding to a geographic location within a designated geographic region. Step 202 may utilize a machine learning clustering algorithm, such as a K-means clustering algorithm, a mini-batch K-means clustering algorithm, a hierarchical clustering algorithm, a density-based spatial clustering of application with noise (DBSCAN) algorithm, and a mean shift clustering algorithm.

Figure 2:
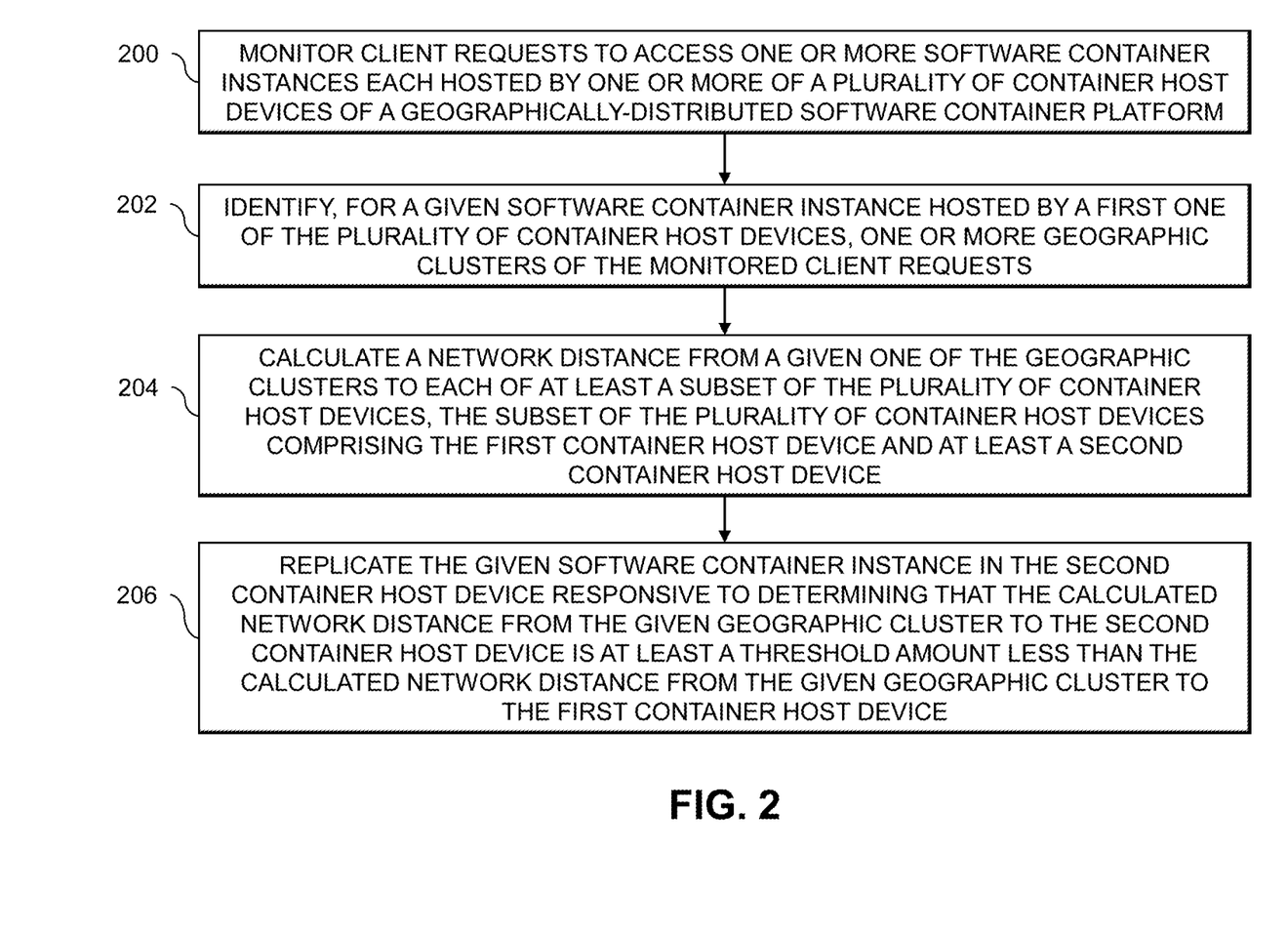
FIG. 2 is a flow diagram of an exemplary process for replicating software containers using geographic location affinity in a distributed computing environment in an illustrative embodiment.

The FIG. 2 process continues with step 204, calculating a network distance from a given one of the geographic clusters to each of at least a subset of the plurality of container host devices, the subset of the plurality of container host devices comprising the first container host device and at least a second container host device. The calculated network distances may be based at least in part on geographic distances between the given geographic cluster and each of the subset of the plurality of container host devices. The calculated network distances may be further based at least in part on available network bandwidth and network latency between the given geographic cluster and each of the subset of the plurality of container host devices. In some embodiments, step 204 utilizes a Haversine distance computation algorithm. It should be appreciated, however, that various other distance computations may be utilized, including combinations of different network computations.

In step 206, the given software container instance is replicated in the second container host device responsive to determining that the calculated network distance from the given geographic cluster to the second container host device is at least a threshold amount less than the calculated network distance from the given geographic cluster to the first container host device. Step 206 may include redirecting network traffic originating in the given geographic cluster from the given software container instance hosted in the first container host device to the replicated software container instance hosted in the second container host device.

It should be appreciated that the steps of the FIG. 2 process may be executed repeatedly or continually. For example, client requests may be monitored continuously, periodically, etc. As live traffic patterns change, the location of the given geographic region may be dynamically updated. Thus, the given software container instance may be replicated on a third one of the plurality of container host devices responsive to calculating updated network distances from the updated location of the given geographic region to the subset of the plurality of container host devices.

Existing container platforms do not have intelligent and autonomous capability for handling a container's location affinity with respect to client requests geographic location (geolocation) origin. Such container platforms existing features typically require some form of manual capacity planning and intervention, and are unable to adapt autonomously "on-the-fly" based on service calls origins and traffic cluster patterns. Even container platforms that consider client requests affinity are typically limited only to container-to-container affinity on a common host.

Illustrative embodiments provide a container platform 102 with a container orchestration engine 112 configured to intelligently monitor application traffic and identify clusters of client requests based on geolocation origin. The container orchestration engine 112 is also configured to calculate network distances among the identified clusters and available physical hosts for containers. The container orchestration engine 112 is further configured to dynamically and autonomously replicate containers in physical hosts which are geographically closer to the identified clusters. Advantageously, the container orchestration engine 112 is able to operate fully in a self-optimizing and self-healing manner using machine learning, thus replacing any manual intervention.

In some embodiments, the container orchestration engine 112 of container platform 102 is configured to dynamically monitor client application traffic (e.g., exchanges between client devices 104 and container instances 110) and utilize machine learning clustering techniques to identify geographical clusters based on the geolocations of the client devices 104. The container orchestration engine 112 then considers available container hosts (e.g., physical container host devices across a distributed computing environment such as a cloud computing environment) and calculates each geographical cluster's network distance to each available container host (or to some threshold number of available container hosts). In some embodiments, a Haversine algorithm or formula to calculate the network distance metrics based on the latitude and longitude of the location of a client request. The container orchestration engine 112 then dynamically and intelligently replicates container instances from one container host to another if the network distance from the former is longer than the latter. The network distance may be measured from the center of each geographical cluster. The container orchestration engine 112 is thus self-optimizing, and reduces the distance between container instances 110 and clusters of the client devices 104 accessing or otherwise utilizing such container instances 110 as much as possible to reduce network latency and improve bandwidth utilization.

Figure 3A:
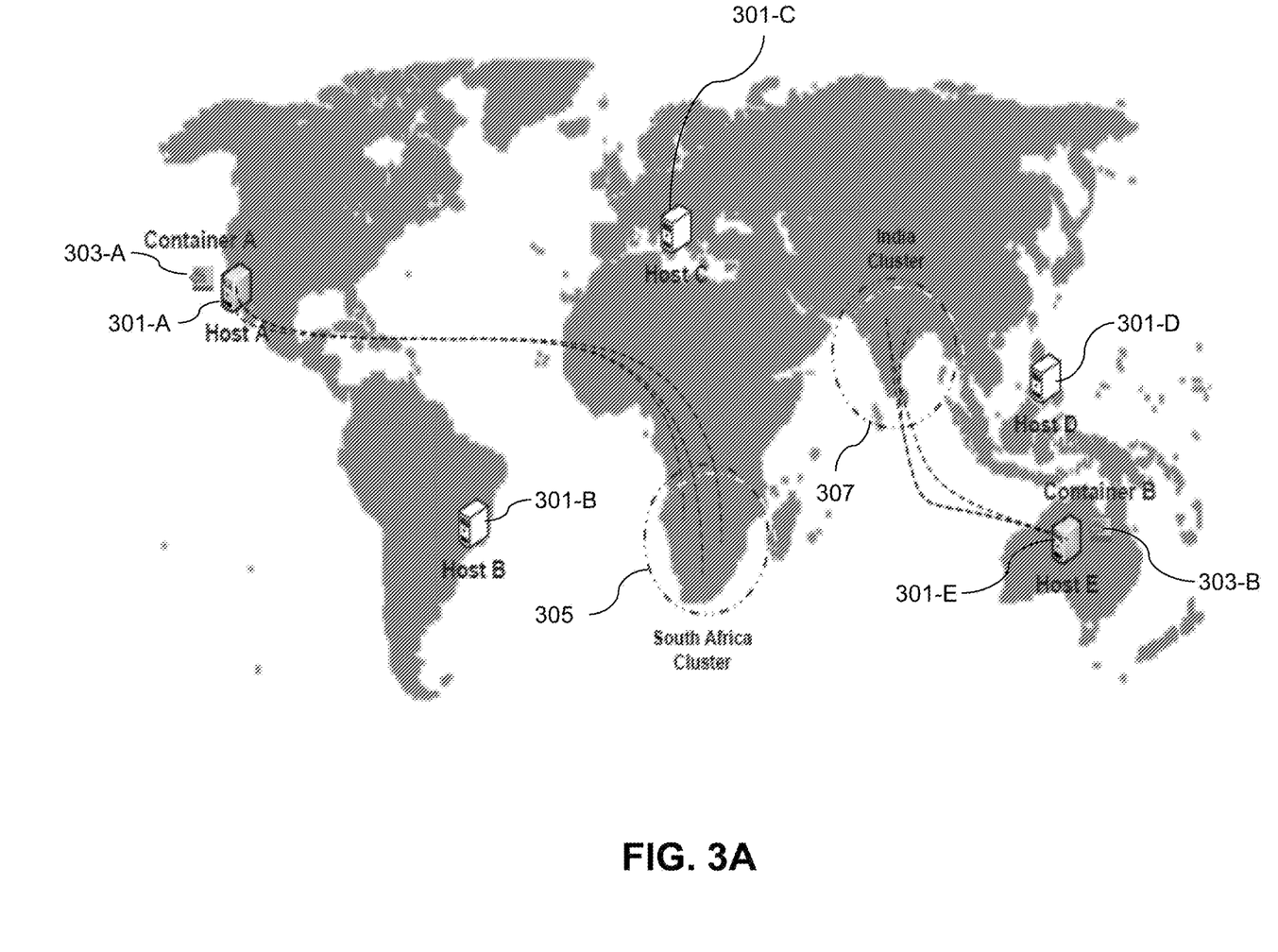
FIGS. 3A-3C show a distributed computing environment and replication of software containers therein in an illustrative embodiment.
Figure 3B:
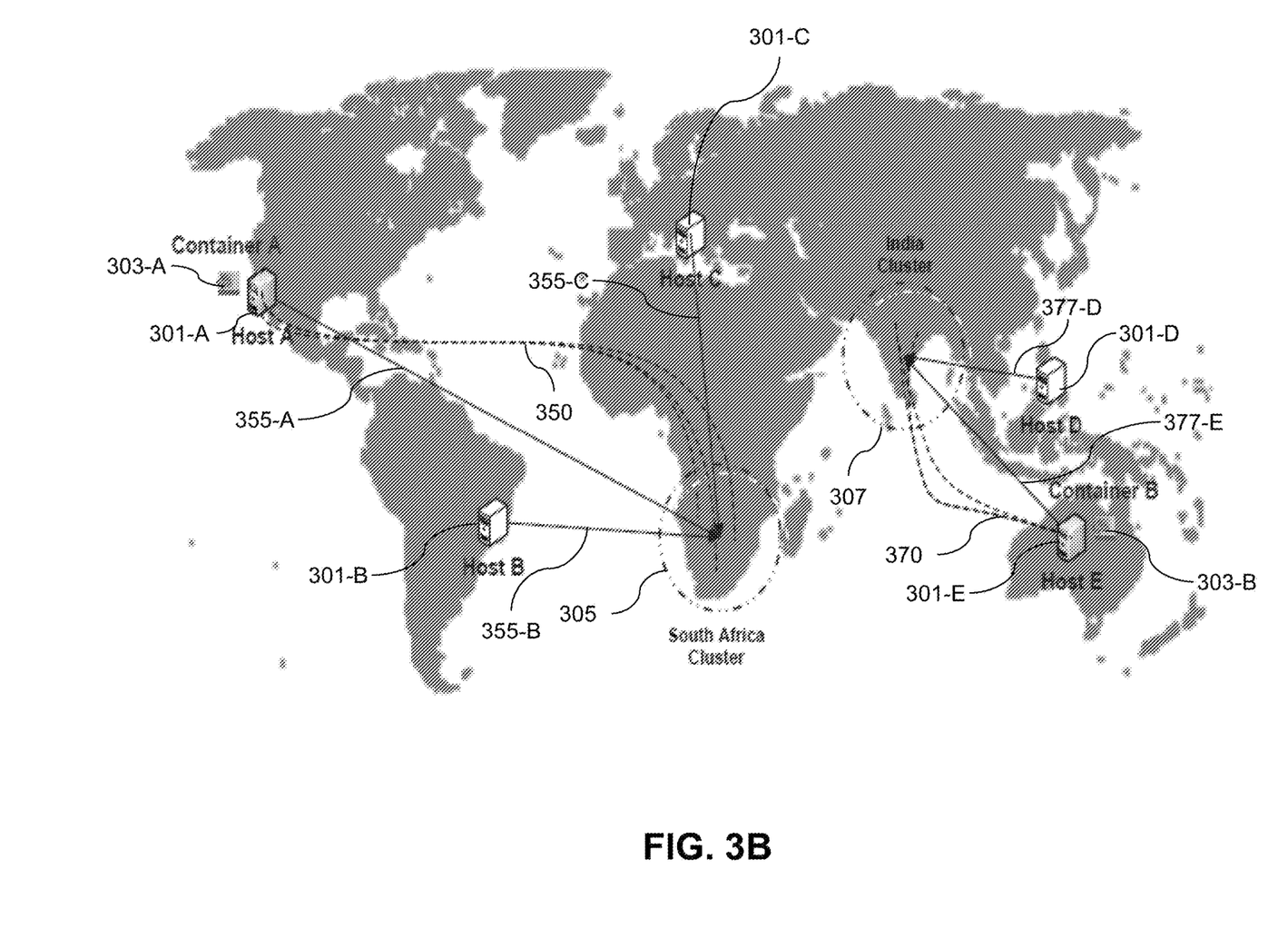
Figure 3C:
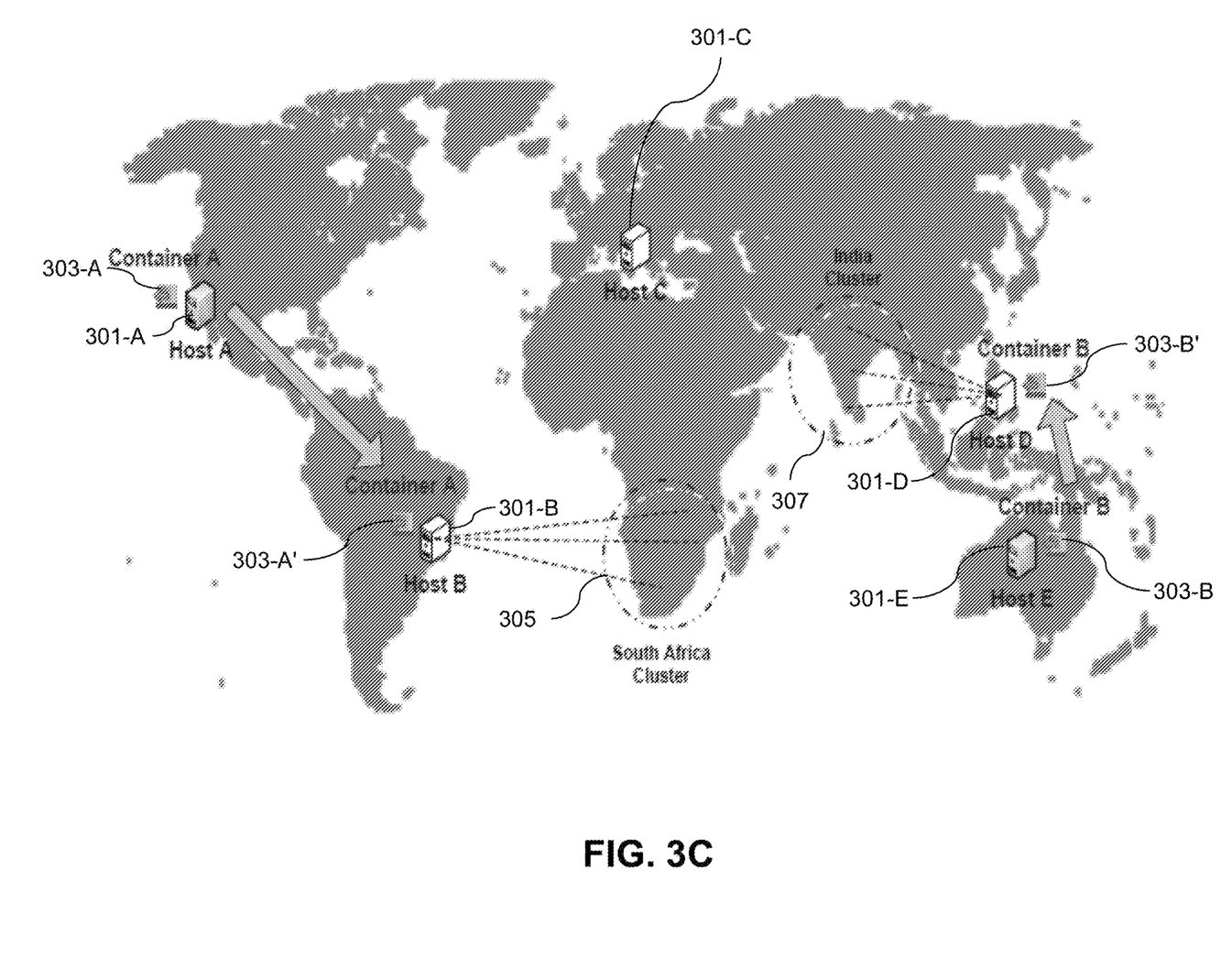

FIGS. 3A-3C show container hosts 301-A through 301-E (collectively, container hosts 301) that are geographically distributed across the globe. Container host 301-A is located in California, container host 301-B is located in Brazil, container host 301-C is located in Italy, container host 301-D is located in the Philippines, and container host 301-E is located in Australia. The container hosts 301 provide an example of a geographically-distributed computing environment.

FIG. 3A shows a first container instance 303-A currently hosted by container host 301-A and a second container instance 303-B currently hosted by container host 303-E. The container instance 303-A has the majority of its client requests originating in South Africa, and the container instance 303-B has the majority of its client requests originating in India. Thus, South Africa and India are identified as potential clusters 305 and 307 for container instances 303-A and 303-B, respectively.

FIG. 3B shows computation of network distance between geographical clusters 305 and 307 and the physical container hosts 301. The container orchestration engine 112 considers available container hosts 301 spread across geolocations, and calculates each of the clusters 305 and 307 distance from each of at least a subset of the available container hosts 301. As described above, such network distance computations may utilize a Haversine formula or algorithm to calculate the network distances based on latitude and longitude of the client request geolocations. (e.g., from a center of each of the clusters 305 and 307). It should be appreciated, however, that in other embodiments other types of network distance metrics may be utilized, including metrics which take into account factors such as available bandwidth and network latency in addition to or in place of physical distance.

In FIG. 3B, network traffic between the container instance 303-A at container host 301-A and the cluster 305 is shown as dashed lines 350, while network traffic between the container instance 303-B at container host 301-E and the cluster 307 is shown as dashed lines 370. Network distances 355-A, 355-B and 355-C (collectively, network distances 355) are computed from the cluster 305 to the container hosts 301-A, 301-B and 301-C, respectively. Network distances 377-D and 377-E (collectively, network distances 377) are computed from the cluster 307 to the container hosts 301-D and 301-E, respectively. Although not shown, it should be appreciated that the network distance between cluster 305 and one or both of container hosts 301-D and 301-E may be calculated in addition to or in place of one or more of the network distances 355. Similarly, the network distance between cluster 307 and one or more of container hosts 301-A, 301-B and 301-C may be calculated in addition to or in place of one or more of the network distances 377. Using the computed network distances 355, it is determined that the container host 301-B is the closest container host to the cluster 305. Using the computed network distances 377, it is determined that the container host 301-D is the closest container host to the cluster 307.

FIG. 3C illustrates autonomous dynamic replication of the container instances 303-A and 303-B (collectively, container instances 303). The container orchestration engine 112 will dynamically and autonomously replicate container instances 303 from source ones of the container hosts 301 to target ones of the container hosts 301 if the network distance from the latter is shorter than the former. In some embodiments, the replication is only initiated if the network distance is shorter by at least some designated threshold, so as to avoid replicating container instances between geographically close container hosts where the improvement is only marginal. The designated threshold may be determined as a minimum network distance. The network distances may be measured from the center of each of the geographical clusters.

In the FIG. 3C example, for the cluster 305 the network distance 355-B is determined to be the shortest among the network distances 355, and thus the container instance 303-A is replicated in container host 301-B as container instance 303-A'. For the cluster 307, the network distance 377-D is determined to be the shortest among the network distances 377, and thus the container instance 303-B is replicated in container host 301-D as container instance 303-B'. After such replication, client traffic from the clusters 305 and 307 are routed to the new replicas 303-A' and 303-B' in container hosts 301-B and 301-D, respectively.

Figure 4:
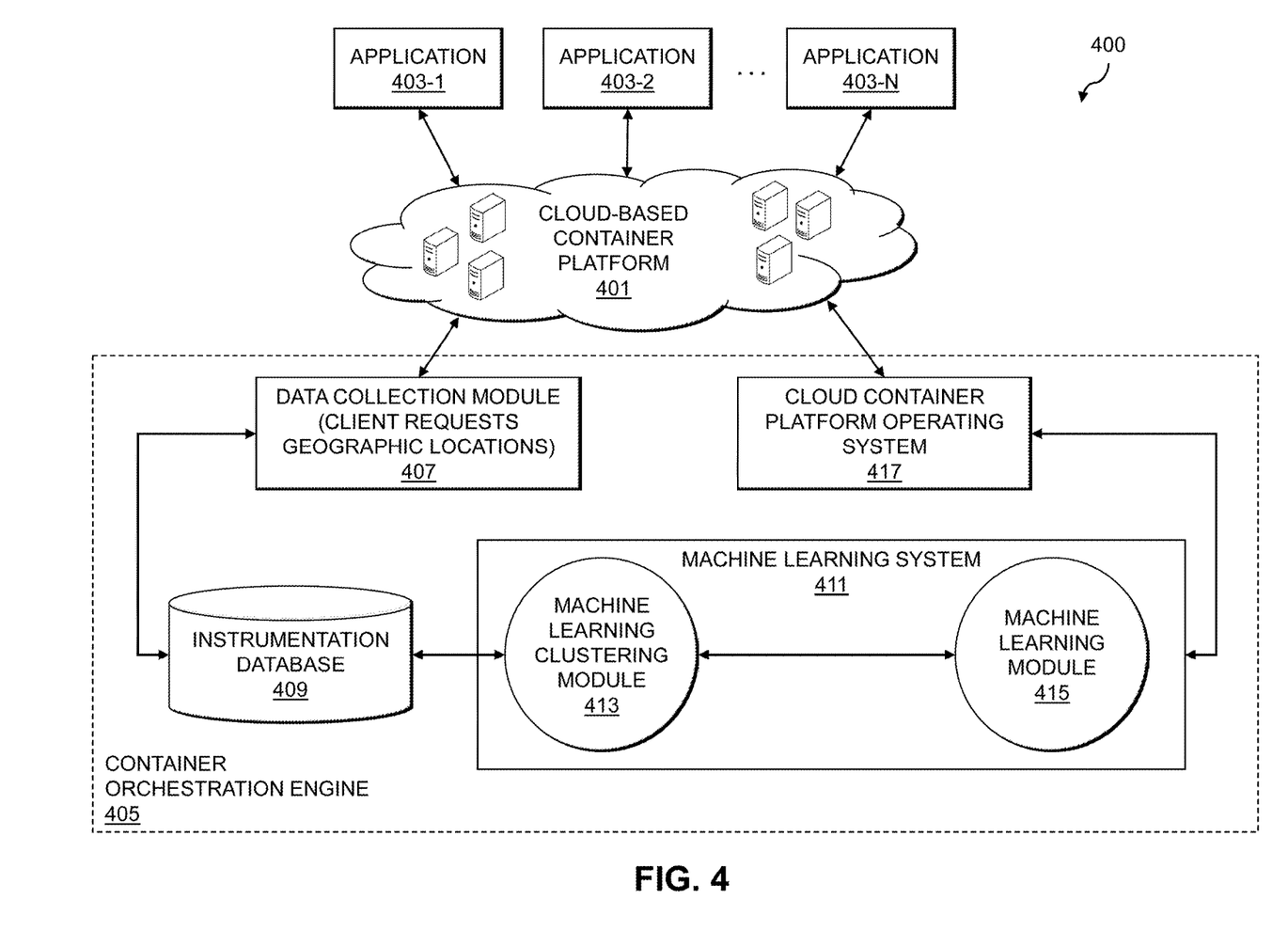
FIG. 4 shows a system workflow for dynamic replication of software containers in an illustrative embodiment.

FIG. 4 shows a system workflow 400 for dynamic replication of software containers using geolocation affinity. Container instances of a cloud-based container platform 401 receives client requests from a set of applications 403-1, 403-2, . . . 403-N (collectively, applications 403). The cloud-based container platform 401 provides the geolocations of the client requests from applications 403 to a data collection module 407 of a container orchestration engine 405 associated with the cloud-based container platform 401. The container orchestration engine 405, although shown in FIG. 4 as external to the cloud-based container platform 401, may be implemented at least partially internal to the cloud-based container platform 401. The data collection module 405 stores the client request geolocations in an instrumentation database 407. A machine learning system 411 implements a machine learning clustering module 413 to cluster the client requests geolocations stored in instrumentation database 409 into a set of geographic clusters. A machine learning module 415 of the machine learning system 411 computes network distances from the clusters to geographically-distributed container hosts in the cloud-based container platform 401 and determines whether to replicate any container instances running on the cloud-based container platform 401 from a source container host to a target container host. The machine learning system 411 instructs a cloud container platform operating system 417 to initiate such replication of the container instances on the cloud-based container platform 401.

Figure 5:
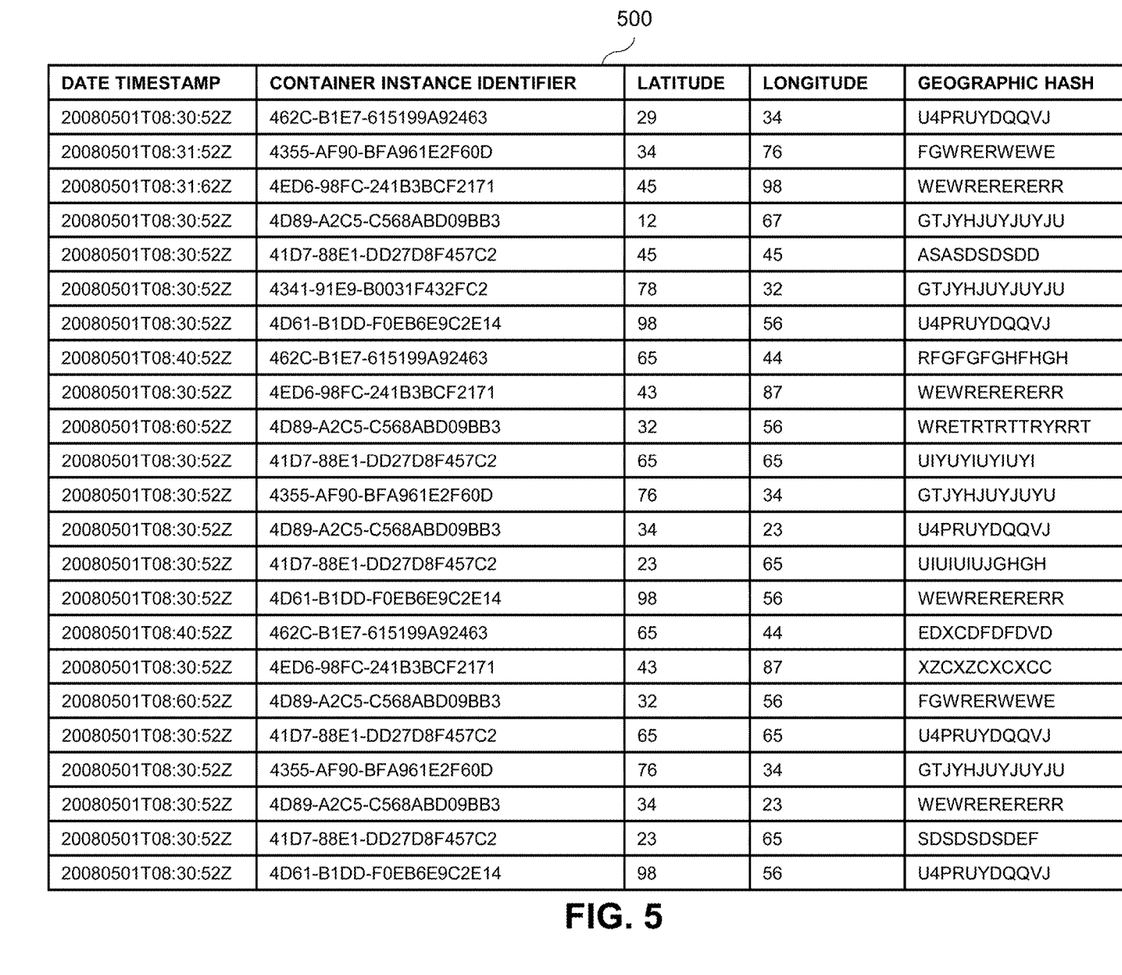
FIG. 5 is a table illustrating sample client request geographic location data in an illustrative embodiment.
Figure 6:
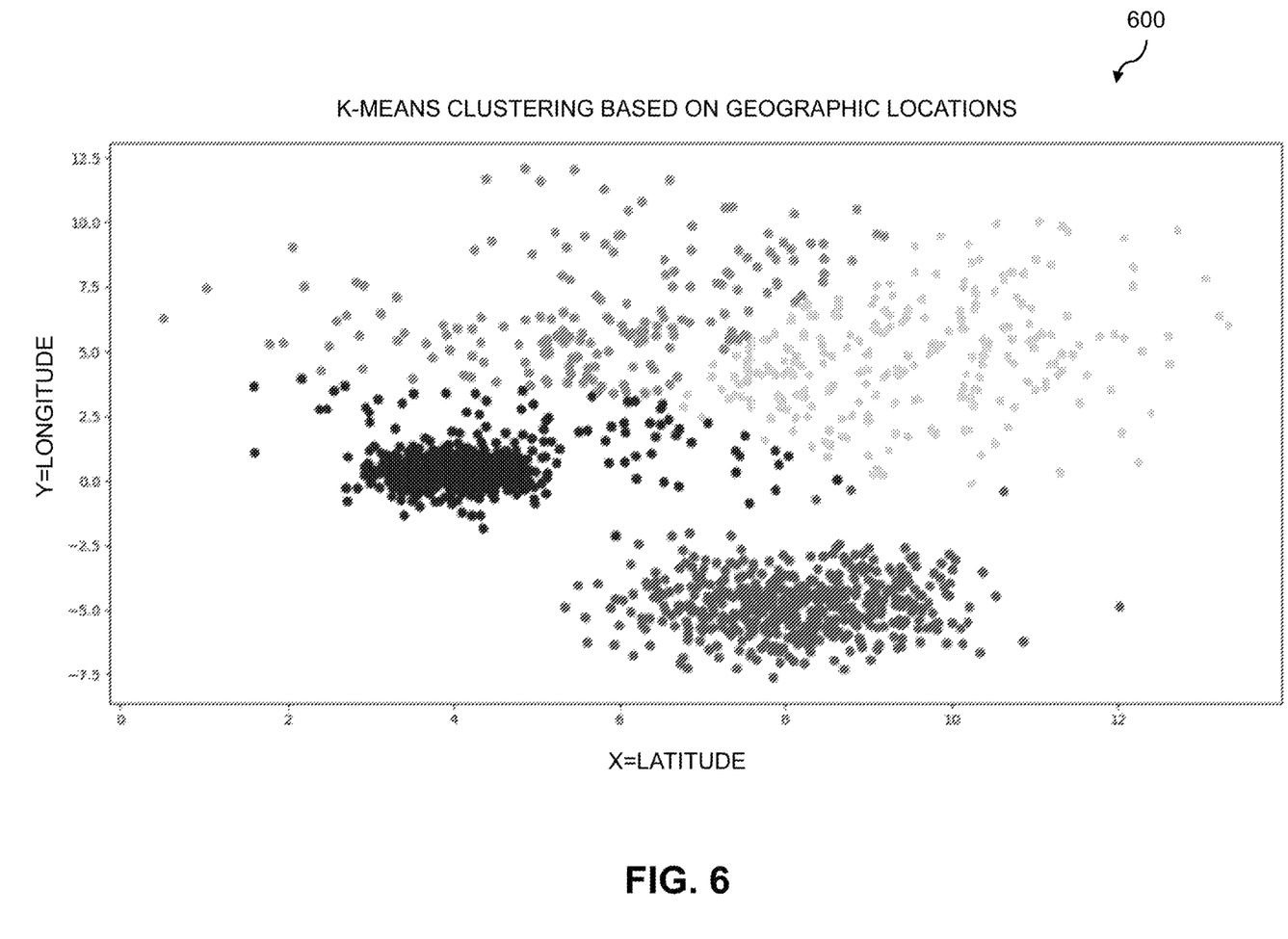
FIG. 6 is a plot illustrating machine learning-based clustering of client request geographic locations in an illustrative embodiment.

In some embodiments, the machine learning clustering module 413 utilizes K-means clustering to identify the geographic clusters. In other embodiments, however, other types of clustering approaches may be used based on factors such as the scale of data, cluster locations, etc. FIG. 5 shows an example table 500 of client requests from random geographic locations. The table 500 includes columns for a date timestamp of client requests, container instance identifier, latitude, longitude and geographic location hash. The geographic location hashes, also referred to as geohashes, may be generated using geohash. Geohash is used to encode geographic locations into alphanumeric short strings based on coordinates of the longitude and latitude. The distance between geohashes corresponds to the distance in latitude/longitude coordinates between two points. As noted above, some embodiments utilize Haversine distance calculations, which may provide accuracy with ±0.50 kilometers (km) variance. FIG. 6 shows a plot 600 of a K-means clustering of sample data.

As noted above, K-means clustering is just one example of a machine learning-based clustering approach that may be used. In other embodiments, the clustering approach is selected to be efficient in handling very large data sets and where the number of per-unit computations should not grow exponentially (as is the case with K-means clustering).

Further the clustering approach should not be required to assume a particular number of clusters K, but rather the number of clusters should be determined dynamically. Further, cluster centroids should not be prone to outliers in data points. Based on the above, various clustering approaches may be used such as mini-batch K-means clustering, or hierarchical clustering algorithms that can solve large data set problems. A DBSCAN algorithm may be used to handle centroid-based outlier distortion seamlessly. Mean shift clustering may also be used, which does not require the number of clusters to be identified in advance. The scale of data can also be handled by predefining large geographical areas as individual data sets, under which the system can scan for clusters rather than considering the entire global data as one set.

Illustrative embodiments provide a self-optimizing distributed computing environment container platform. Advantageously, the self-optimizing container platform identifies geographical clusters of client requests based on geolocations using machine learning clustering techniques. Then, using network distance measurements (e.g., calculated separately using a Haversine formula or algorithm), the self-optimizing container platform determines the nearest available physical container host in the container platform. The self-optimizing container platform dynamically and autonomously replicates container instances in physical hosts that are geographically closer to the clients based on live or real-time traffic flow information.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for replicating software containers using geographic location affinity in a distributed computing environment will now be described in greater detail with reference to FIGS. 7 and 8. Although described in the context of system 100, these platforms may also be used to implement at least portions of other information processing systems in other embodiments.

Figure 7:
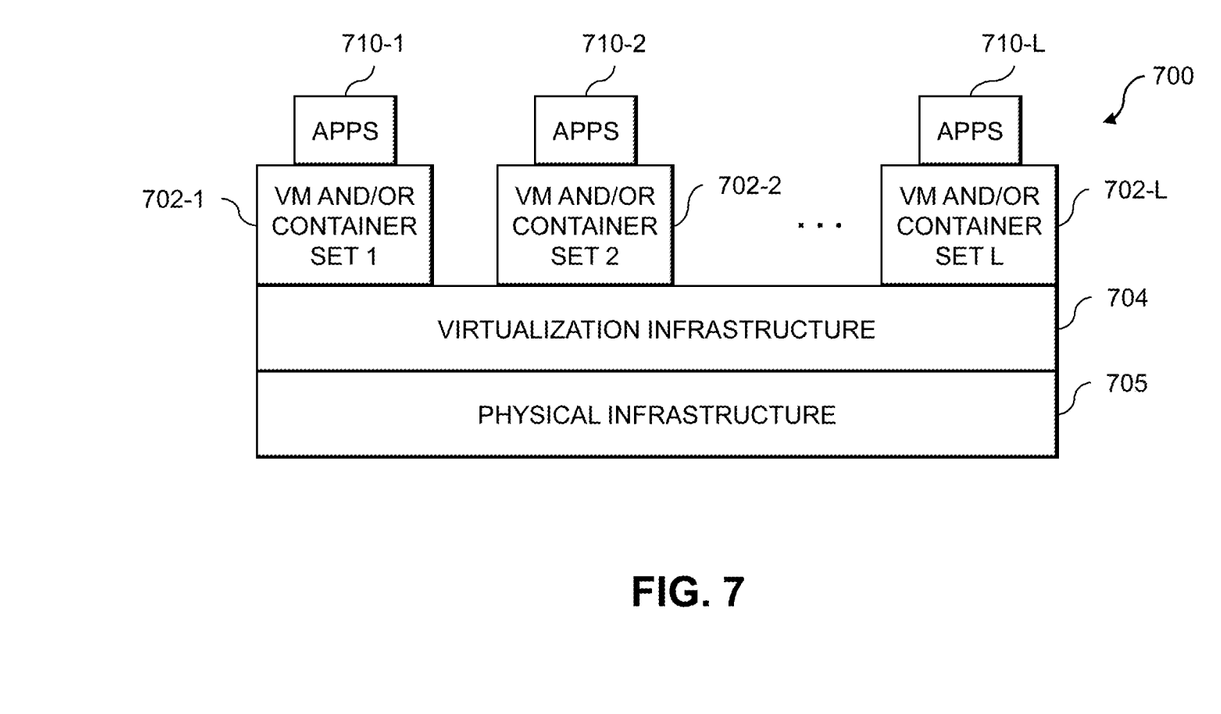
FIGS. 7 and 8 show examples of processing platforms that may be utilized to implement at least a portion of an information processing system in illustrative embodiments.
Figure 8:
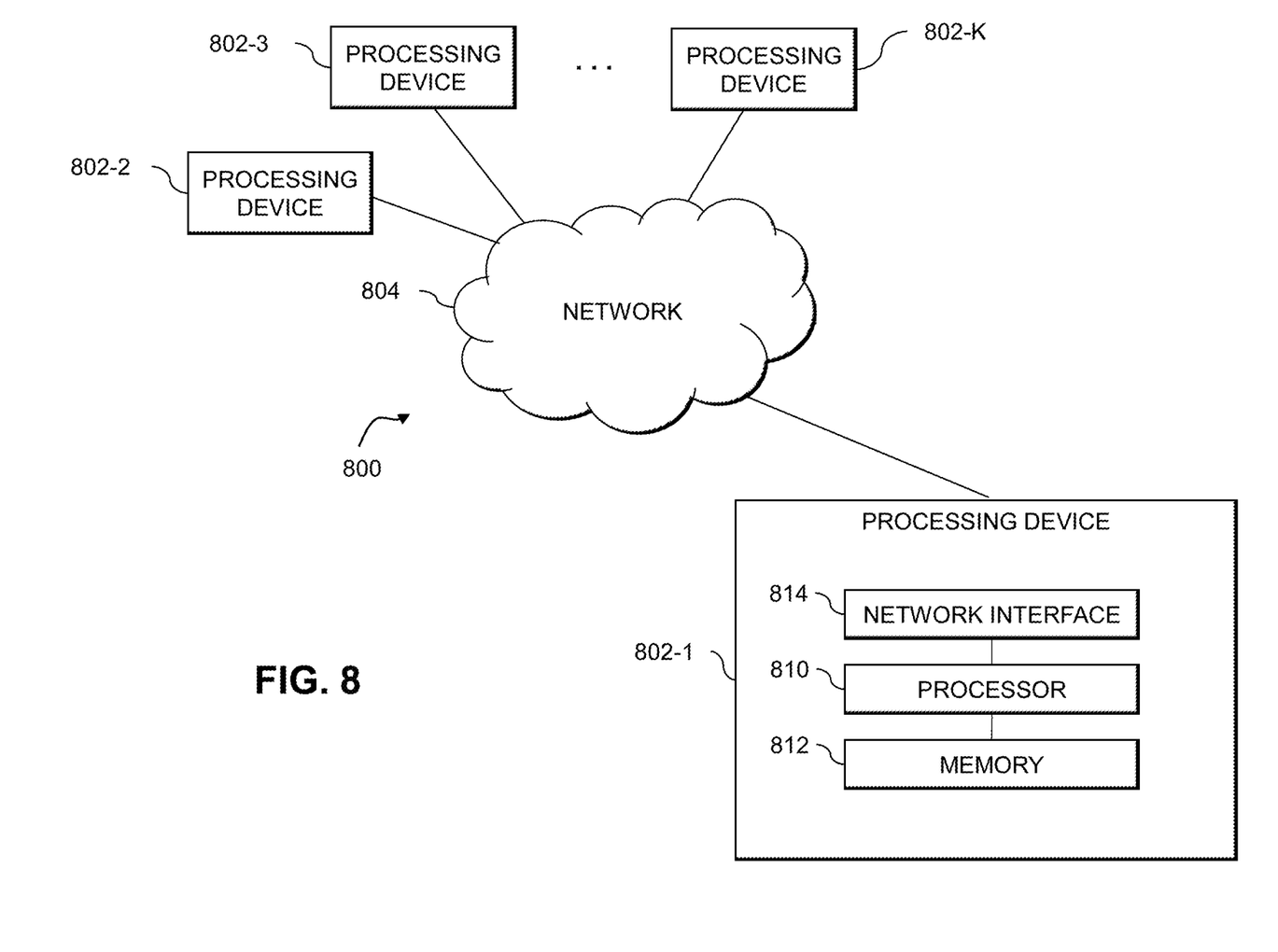

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for replicating software containers using geographic location affinity in a distributed computing environment as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container platforms, machine learning algorithms, clustering algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
monitoring client requests to access one or more software container instances each hosted by one or more of a plurality of container host devices of a geographically-distributed software container platform;
identifying, for a given software container instance hosted by a first one of the plurality of container host devices, one or more geographic clusters of the monitored client requests;
calculating a network distance from a given one of the geographic clusters to each of at least a subset of the plurality of container host devices, the subset of the plurality of container host devices comprising the first container host device and at least a second container host device; and
replicating the given software container instance in the second container host device responsive to determining that the calculated network distance from the given geographic cluster to the second container host device is at least a threshold amount less than the calculated network distance from the given geographic cluster to the first container host device;
wherein identifying the one or more geographic clusters of the monitored client requests comprises specifying two or more geographic areas and utilizing a machine learning-based clustering algorithm to scan for geographic clusters within each of the specified two or more geographic areas individually;
wherein the method is performed by at least one processing device comprising a processor coupled to a memory.

2. The method of claim 1 wherein the geographically-distributed container platform comprises a cloud computing platform.

3. The method of claim 1 wherein monitoring the client requests comprises, for a given client request, obtaining:
a timestamp of the given client request;
a container instance identifier; and
a latitude and longitude of a geographic location of a source application providing the given client request.

4. The method of claim 3 wherein identifying the one or more geographic clusters comprises identifying the given geographic cluster utilizing respective ones of the client requests each comprising:
an associated container instance identifier matching a given container instance identifier of the given software container instance;
an associated timestamp within a designated threshold of a current time; and
an associated latitude and longitude corresponding to a geographic location within a designated geographic region.

5. The method of claim 1 wherein the machine learning-based clustering algorithm comprises a K-means clustering algorithm.

6. The method of claim 1 wherein the machine learning-based clustering algorithm comprises at least one of: a mini-batch K-means clustering algorithm, a hierarchical clustering algorithm, a density-based spatial clustering of application with noise algorithm, and a mean shift clustering algorithm.

7. The method of claim 1 wherein the calculated network distances are based at least in part on geographic distances between the given geographic cluster and each of the subset of the plurality of container host devices.

8. The method of claim 7 wherein the calculated network distances are further based at least in part on available network bandwidth and network latency between the given geographic cluster and each of the subset of the plurality of container host devices.

9. The method of claim 1 wherein calculating the network distance from the given geographic cluster to each of the subset of the plurality of container host devices comprises utilizing a Haversine distance computation algorithm.

10. The method of claim 1 further comprising:
dynamically updating a location of the given geographic region based on monitoring of additional client requests directed to the replicated software container instance; and
determining whether to replicate the given software container instance on a third one of the plurality of container host devices responsive to calculating updated network distances from the updated location of the given geographic region to the subset of the plurality of container host devices.

11. The method of claim 1 wherein replicating the given software container instance in the second container host device further comprises redirecting network traffic originating in the given geographic cluster from the given software container instance hosted in the first container host device to the replicated software container instance hosted in the second container host device.

12. A computer program product comprising a non-transitory processor-readable storage medium having stored therein program code of one or more software programs, wherein the program code when executed by at least one processing device causes the at least one processing device to perform steps of:
   monitoring client requests to access one or more software container instances each hosted by one or more of a plurality of container host devices of a geographically-distributed software container platform;
   identifying, for a given software container instance hosted by a first one of the plurality of container host devices, one or more geographic clusters of the monitored client requests;
   calculating a network distance from a given one of the geographic clusters to each of at least a subset of the plurality of container host devices, the subset of the plurality of container host devices comprising the first container host device and at least a second container host device; and
   replicating the given software container instance in the second container host device responsive to determining that the calculated network distance from the given geographic cluster to the second container host device is at least a threshold amount less than the calculated network distance from the given geographic cluster to the first container host device;
   wherein identifying the one or more geographic clusters of the monitored client requests comprises specifying two or more geographic areas and utilizing a machine learning-based clustering algorithm to scan for geographic clusters within each of the specified two or more geographic areas individually.

13. The computer program product of claim 12 wherein monitoring the client requests comprises, for a given client request, obtaining:
   a timestamp of the given client request;
   a container instance identifier; and
   a latitude and longitude of a geographic location of a source application providing the given client request.

14. The computer program product of claim 13 wherein identifying the one or more geographic clusters comprises identifying the given geographic cluster utilizing respective ones of the client requests each comprising:
   an associated container instance identifier matching a given container instance identifier of the given software container instance;
   an associated timestamp within a designated threshold of a current time; and
   an associated latitude and longitude corresponding to a geographic location within a designated geographic region.

15. The computer program product of claim 12 wherein replicating the given software container instance in the second container host device further comprises redirecting network traffic originating in the given geographic cluster from the given software container instance hosted in the first container host device to the replicated software container instance hosted in the second container host device.

16. An apparatus comprising:
   at least one processing device comprising a processor coupled to a memory;
   the at least one processing device being configured to perform steps of:
      monitoring client requests to access one or more software container instances each hosted by one or more of a plurality of container host devices of a geographically-distributed software container platform;
      identifying, for a given software container instance hosted by a first one of the plurality of container host devices, one or more geographic clusters of the monitored client requests;
      calculating a network distance from a given one of the geographic clusters to each of at least a subset of the plurality of container host devices, the subset of the plurality of container host devices comprising the first container host device and at least a second container host device; and
      replicating the given software container instance in the second container host device responsive to determining that the calculated network distance from the given geographic cluster to the second container host device is at least a threshold amount less than the calculated network distance from the given geographic cluster to the first container host device;
   wherein identifying the one or more geographic clusters of the monitored client requests comprises specifying two or more geographic areas and utilizing a machine learning-based clustering algorithm to scan for geographic clusters within each of the specified two or more geographic areas individually.

17. The apparatus of claim 16 wherein monitoring the client requests comprises, for a given client request, obtaining:
   a timestamp of the given client request;
   a container instance identifier; and
   a latitude and longitude of a geographic location of a source application providing the given client request.

18. The apparatus of claim 17 wherein identifying the one or more geographic clusters comprises identifying the given geographic cluster utilizing respective ones of the client requests each comprising:
   an associated container instance identifier matching a given container instance identifier of the given software container instance;
   an associated timestamp within a designated threshold of a current time; and
   an associated latitude and longitude corresponding to a geographic location within a designated geographic region.

19. The apparatus of claim 16 wherein replicating the given software container instance in the second container host device further comprises redirecting network traffic originating in the given geographic cluster from the given software container instance hosted in the first container host device to the replicated software container instance hosted in the second container host device.

20. The apparatus of claim 16 wherein the calculated network distances are based at least in part on geographic distances between the given geographic cluster and each of the subset of the plurality of container host devices, the geographic distances being computed utilizing geographic location hashes that encode geographic locations into alphanumeric strings based at least in part on a latitude and longitude associated with the given geographic cluster and latitudes and longitudes of the subset of the plurality of container host devices.

* * * * *